US012562905B2

(12) United States Patent
Sundararajan et al.

(10) Patent No.: US 12,562,905 B2
(45) Date of Patent: Feb. 24, 2026

(54) SYSTEM AND METHOD FOR ENCRYPTING USER DEVICE RESOURCE TRANSACTIONS

(71) Applicant: BANK OF AMERICA CORPORATION, Charlotte, NC (US)

(72) Inventors: Vasantha Lakshmi Meenakshi Sundararajan, Tamil Nadu (IN); Manju Priya V, Tamil Nadu (IN); Aiswary R, Tamil Nadu (IN); Vignesh A S, Tamil Nadu (IN); Maneesh Kumar Sethia, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 69 days.

(21) Appl. No.: 18/418,656

(22) Filed: Jan. 22, 2024

(65) Prior Publication Data

US 2025/0240164 A1      Jul. 24, 2025

(51) Int. Cl.
| | |
|---|---|
| *H04L 9/30* | (2006.01) |
| *H04L 9/00* | (2022.01) |
| *H04L 9/32* | (2006.01) |

(52) U.S. Cl.
CPC .......... *H04L 9/3093* (2013.01); *H04L 9/3231* (2013.01); *H04L 9/3297* (2013.01); *H04L 9/50* (2022.05)

(58) Field of Classification Search
CPC ... H04L 9/3093; H04L 9/3231; H04L 9/3297; H04L 9/50
USPC ........................................................ 713/155
See application file for complete search history.

(56) References Cited

U.S. PATENT DOCUMENTS

| | | | |
|---|---|---|---|
| 10,192,214 B2 | 1/2019 | Jiang | |
| 10,223,690 B2 | 3/2019 | Hird | |
| 10,373,149 B1 | 8/2019 | Sather | |
| 10,475,024 B1 | 11/2019 | Behren | |
| 10,785,243 B1 * | 9/2020 | Han ......................... | G06N 7/01 |
| 10,855,473 B1 * | 12/2020 | Griffin ................. | H04L 9/3239 |
| 11,804,956 B2 | 10/2023 | Chaudhari | |
| 11,823,186 B2 | 11/2023 | Quigley | |
| 2013/0329883 A1 * | 12/2013 | Tamayo-Rios .......... | H04L 9/008 |
| | | | 380/28 |

(Continued)

FOREIGN PATENT DOCUMENTS

| | | |
|---|---|---|
| CA | 2876364 C | 3/2023 |
| CN | 103778535 A | 5/2014 |

(Continued)

*Primary Examiner* — Meng Vang
(74) *Attorney, Agent, or Firm* — Moore & Van Allen PLLC; William Walters

(57) ABSTRACT

Systems, computer program products, and methods are described herein for encrypting user device resource transactions. The present disclosure is configured to transmit user data to a neural network, wherein the user data includes gesture data, and wherein the neural network sequences the user data in a unique sequence. Further, the present disclosure is configured to encrypt the user data to create encrypted user data, wherein the encrypted user data includes encrypted gesture data, and wherein encrypting the user data comprises a lattice-based multivariate polynomial encryption. Further, the present disclosure is configured to store the encrypted user data in a blockchain. Further, the present disclosure is configured to validate the blockchain with a consensus algorithm.

11 Claims, 5 Drawing Sheets

(56)                    References Cited

U.S. PATENT DOCUMENTS

| | | | | |
|---|---|---|---|---|
| 2014/0195429 | A1 | 7/2014 | Paulsen | |
| 2020/0084483 | A1* | 3/2020 | Brown | G06Q 20/405 |
| 2020/0285721 | A1* | 9/2020 | Gosalia | G06F 21/34 |
| 2021/0004792 | A1* | 1/2021 | Kikinis | G06Q 20/3827 |
| 2021/0233204 | A1* | 7/2021 | Alattar | G10L 19/018 |
| 2023/0186296 | A1* | 6/2023 | Vines | G06Q 20/389 |
| | | | | 705/71 |
| 2023/0261869 | A1* | 8/2023 | Russell, III | G06F 21/6218 |
| | | | | 726/9 |

FOREIGN PATENT DOCUMENTS

| | | | | | |
|---|---|---|---|---|---|
| CN | 112602300 | | 4/2021 | | |
| CN | 114175078 | A | 3/2022 | | |
| CN | 115001785 | B | * 9/2024 | | H04L 63/083 |
| EP | 2590104 | A1 | 5/2013 | | |
| EP | 2805536 | A2 | 11/2014 | | |
| EP | 3095081 | A1 | 11/2016 | | |
| JP | 2022501871 | A | 1/2022 | | |
| JP | 2022501872 | A | 1/2022 | | |
| KR | 20110094732 | A | 8/2011 | | |
| KR | 102025816 | B1 | 9/2019 | | |
| WO | 2013109372 | A1 | 7/2013 | | |
| WO | 2015107346 | A1 | 7/2015 | | |

* cited by examiner

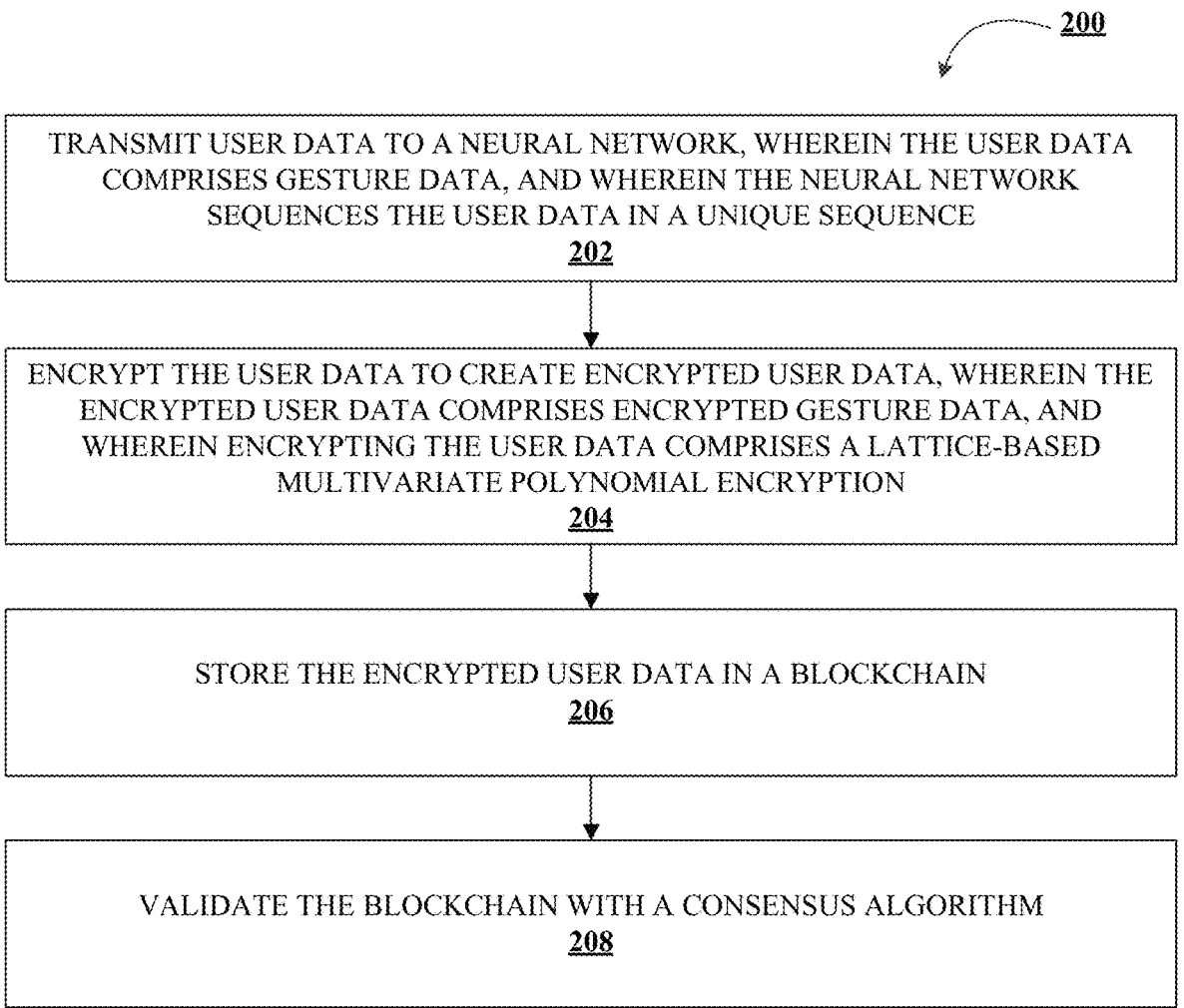

200

TRANSMIT USER DATA TO A NEURAL NETWORK, WHEREIN THE USER DATA COMPRISES GESTURE DATA, AND WHEREIN THE NEURAL NETWORK SEQUENCES THE USER DATA IN A UNIQUE SEQUENCE
202

ENCRYPT THE USER DATA TO CREATE ENCRYPTED USER DATA, WHEREIN THE ENCRYPTED USER DATA COMPRISES ENCRYPTED GESTURE DATA, AND WHEREIN ENCRYPTING THE USER DATA COMPRISES A LATTICE-BASED MULTIVARIATE POLYNOMIAL ENCRYPTION
204

STORE THE ENCRYPTED USER DATA IN A BLOCKCHAIN
206

VALIDATE THE BLOCKCHAIN WITH A CONSENSUS ALGORITHM
208

FIGURE 2

SYSTEM AND METHOD FOR ENCRYPTING USER DEVICE RESOURCE TRANSACTIONS

TECHNOLOGICAL FIELD

Example embodiments of the present disclosure relate to encrypting user device resource transactions.

BACKGROUND

There are significant challenges associated with encrypting user device resource transactions. Applicant has identified a number of deficiencies and problems associated with encrypting user device resource transactions. Through applied effort, ingenuity, and innovation, many of these identified problems have been solved by developing solutions that are included in embodiments of the present disclosure, many examples of which are described in detail herein.

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for encrypting user device resource transactions.

Embodiments of the present invention address the above needs and/or achieve other advantages by providing apparatuses (e.g., a system, computer program product, and/or other devices) and methods for encrypting user device resource transactions. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the present invention may transmit user data to a neural network, wherein the user data comprises gesture data, and wherein the neural network sequences the user data in a unique sequence. In some embodiments, the present invention may encrypt the user data to create encrypted user data, wherein the encrypted user data comprises encrypted gesture data, and wherein encrypting the user data comprises a lattice-based multivariate polynomial encryption. In some embodiments, the present invention may store the encrypted user data in a blockchain. In some embodiments, the present invention may validate the blockchain with a consensus algorithm.

In some embodiments, the present invention may receive the user data from a user device, wherein the user data comprises biometric and geolocation data, and wherein the user device comprises a wearable user device.

In some embodiments, the neural network includes a recurrent neural network, wherein the recurrent neural network maps the user data to the unique sequence in a lattice.

In some embodiments, the lattice includes a digital personal identification number (PIN), a timestamp, and the user data.

In some embodiments, the blockchain includes one or more blocks, wherein the one or more blocks include additional data from one or more entities.

In some embodiments, validating the blockchain with the consensus algorithm further includes determining a malicious block, wherein the malicious block is associated with the blockchain. In some embodiments, validating the blockchain with the consensus algorithm further includes invalidating the malicious block, wherein invalidating the malicious block includes reconfiguring the blockchain to disassociate with the malicious block.

In some embodiments, the consensus algorithm includes a proof of authority consensus algorithm.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
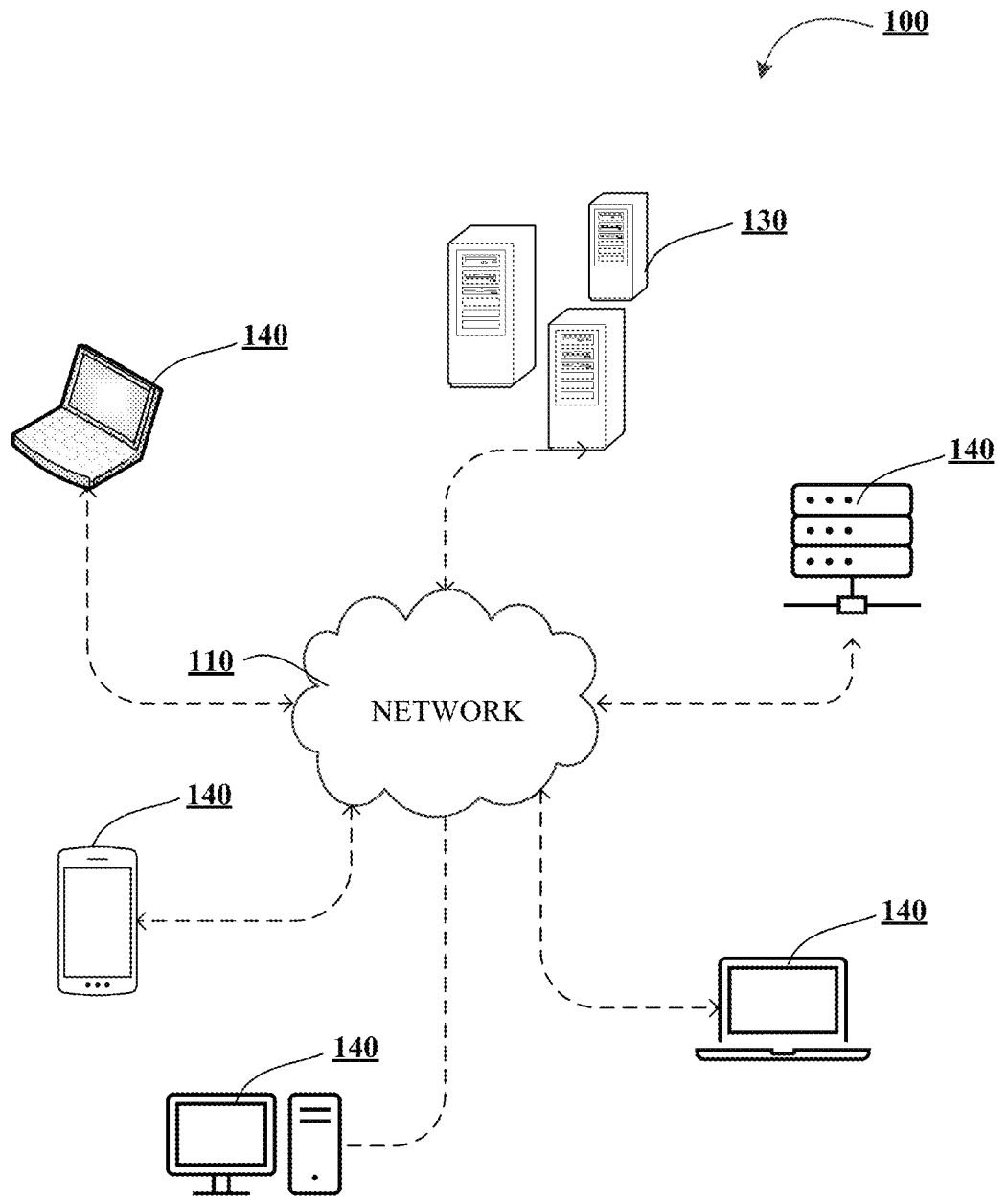
Figure 1B:
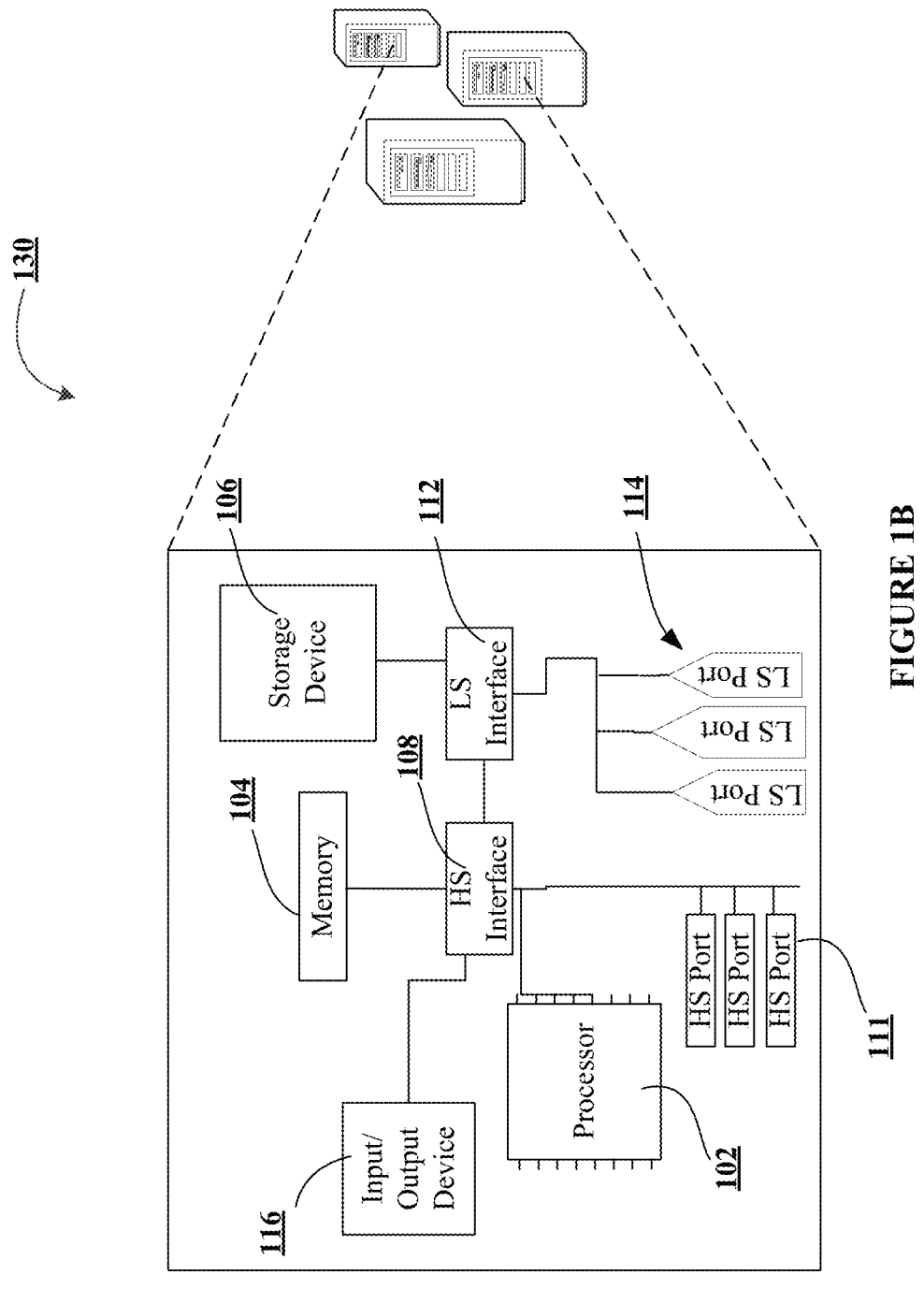
Figure 1C:
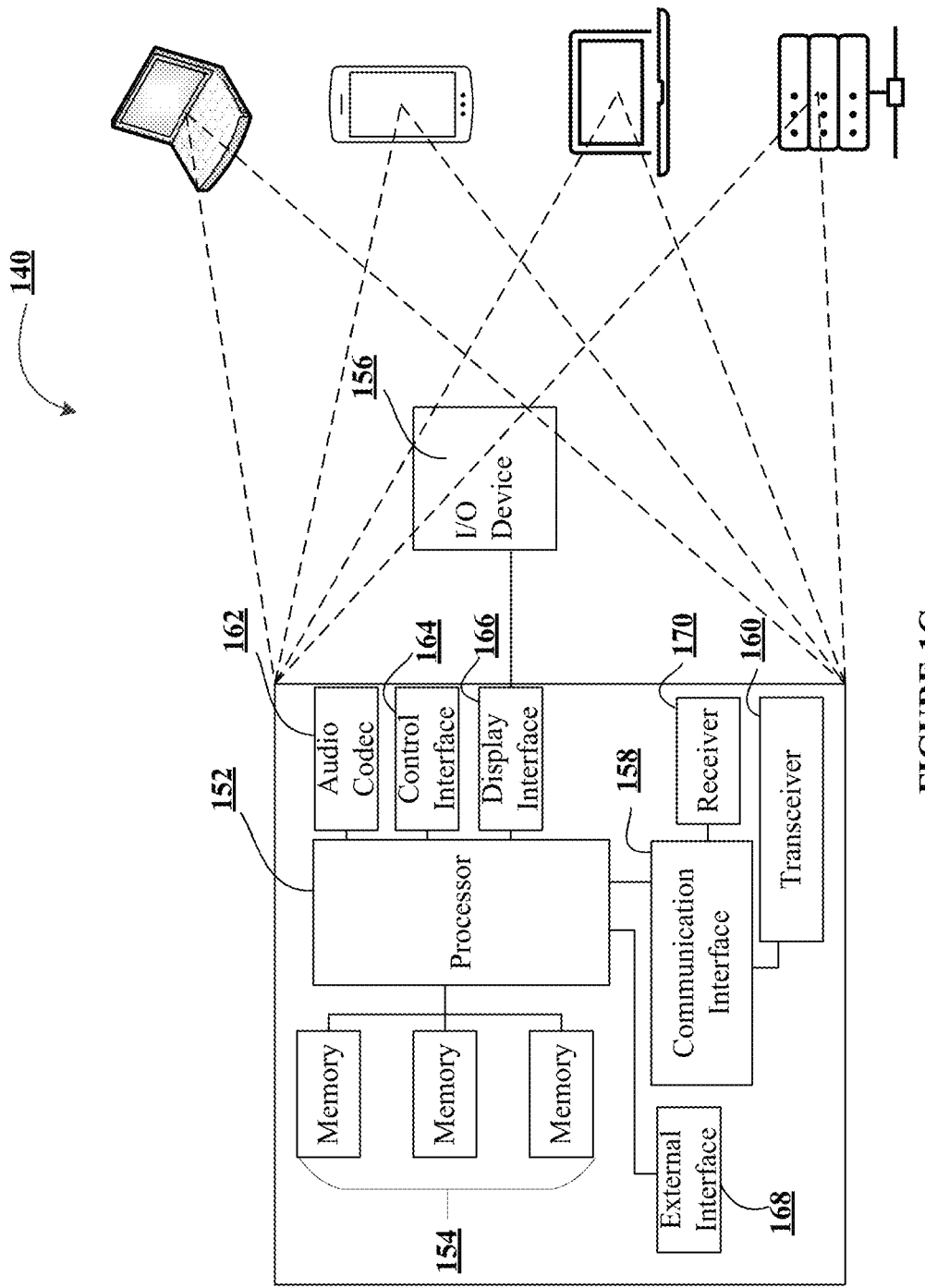
Figure 3:
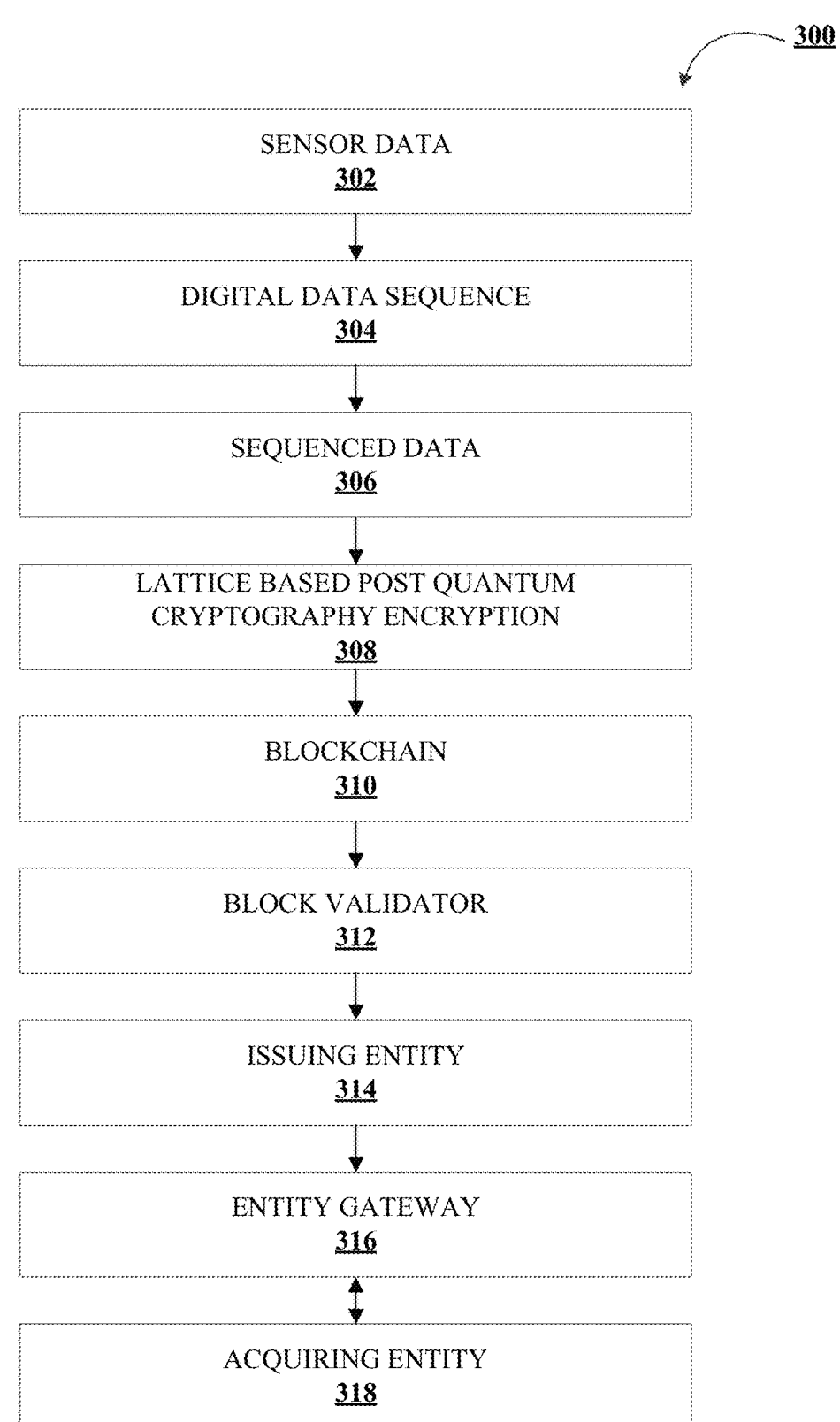

FIGS. 1A-1C illustrates technical components of an exemplary distributed computing environment for encrypting user device resource transactions, in accordance with an embodiment of the disclosure;

FIG. 2 illustrates a process flow for encrypting user device resource transactions, in accordance with an embodiment of the disclosure; and FIG. 3 illustrates a process flow of an example embodiment of the user device encryption system, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more,"

even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "transfer," a "distribution," and/or an "allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

In the modern world, wearable devices are becoming increasingly popular and are being used for a variety of purposes including, but not limited to, fitness tracking, health monitoring, notification delivery, remote control of other devices, and for payment transactions. This expanded list of use cases for wearable devices, however, has also increased the opportunity for misappropriating sensitive information of the user of the wearable device.

One such uncertainty is the backward personal identification number (PIN) sequence inference algorithm. This algorithm may be used to misappropriate PINs by analyzing the sensor data from wearable devices. The algorithm works by analyzing the hand gestures from the user as the user presses the user's PIN sequence on the PIN pad. The sensor data related to the hand motions of the user may then be used to infer the PIN sequence, leading to a misappropriation of the user's PIN.

Other types of misappropriation are internal and sniffing misappropriations. For these, a wrongdoer may gain access to the sensors of the wearable device through malware. When the user accesses a key-based security system, the malware sends sensor data back to the wrongdoer. The wrongdoer can also place a wireless sniffer close to a key-based security system to eavesdrop on sensor data from a user's wearable device that uses Bluetooth to communicate with the user's mobile device. Therefore, a need exists to store data associated with a wearable device in encrypted form.

The present invention may receive data from sensors associated with a wearable device. The data is ordered in a unique sequence using recurrent neural networks (RNNs), which works by saving the output of a particular layer in the neural network and feeding the output back to the input in order to predict the output of the layer. The ordered sequence is encrypted used lattice based Post-Quantum Cryptography (PQC). The encrypted data is stored in blocks in a blockchain, which are then validated using a Proof-of-Authority (PoA) consensus algorithm to ensure the blocks are from trusted users.

What is more, the present disclosure provides a technical solution to a technical problem. As described herein, the technical problem includes misappropriations of sensor data associated with a user's wearable device. The technical solution presented herein allows for the senor data associated with the user's wearable device to be encrypted, stored in a blockchain, and validated. In particular, the user device encryption system is an improvement over existing solutions to the issues relating to misappropriating user data associated with a wearable device, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

In addition, the technical solution described herein is an improvement to computer technology and is directed to non-abstract improvements to the functionality of a computer platform itself. Specifically, the user device encryption system as described herein is a solution to the problem of wearable device sensor data being misappropriated. Further, the user device encryption system may be characterized as identifying a specific improvement in computer capabilities and/or network functionalities in response to the user device encryption system's integration to existing devices, software, applications, and/or the like. In this way, the user device encryption system improves the capability of a system to effectively and efficiently encrypt and protect user data associated with a wearable device. Further, the user device encryption system improves the functionality of networks in response to reducing the resources consumed by the system (e.g., network resources, computing resources, memory resources, and/or the like).

FIGS. 1A-1C illustrate technical components of an exemplary distributed computing environment 100 for encrypting user device resource transactions, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet.

Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor

152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 illustrates a process flow for encrypting user device resource transactions, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, a user device encryption system (e.g., similar to one or more of the systems described herein with respect to FIGS. 1A-1C) may perform one or more of the steps of process flow 200. For example, a user device encryption system (e.g., the system 130 described herein with respect to FIGS. 1A-1C) may perform the steps of process flow 200.

As shown in block 202, the process flow 200 of this embodiment includes transmitting user data to a neural network, wherein the user data includes gesture data, and wherein the neural network sequences the user data in a unique sequence. The neural network may include an input layer, one or more hidden layers, and an output layer. The input layer may initially receive the user data. The hidden layer(s) may then perform calculations on the user data. These calculations may include analysis, interpretations, extractions, and/or the like. The output layer may then present the user data into a usable form for the next step in the process.

In some embodiments, the invention may receive the user data from a user device, wherein the user data includes biometric data and geolocation data. In some embodiments, the user data may also include physical activity data, health metrics, sleep data, location data, environmental data, interaction data, notifications and responses, and/or the like. The biometric data may include data associated with the user's gesture, motion, relative positioning, and/or the like. In this way, the biometric data may include the way in which the user interacts with the user's surroundings. For instance, the biometric data may include how the user types in the user's PIN to a keypad. In this example, the biometric data may include the user's gesture (e.g., moving the user's hand to the keypad), the user's motion (e.g., the movement of the user's hand and/or appendages as the user types in the PIN), and the relative positioning of the user (e.g., the position of the user's hand compared to the user's surroundings).

In some embodiments, the relative positioning of the user may include the user's position compared with another device, wherein the device may or may not be associated with the user. For example, the relative positioning may include the positioning of the user compared to another user device (e.g., a mobile device, a personal computer, a tablet, an additional wearable device, and/or the like). In addition, the relative positioning may include the positioning of the user compared to a device not associated with the user (e.g., a kiosk, an automated teller machine (ATM), a terminal, a keypad, a security box, and/or the like).

In some embodiments, the geolocation data may include the geolocation of the user in terms of coordinates, geographic positioning, longitude and latitude, a global positioning system, and/or the like. The geolocation data may indicate if the user is at a particular location (e.g., a keypad). In some embodiments, the user device encryption system may activate when the user is at a particular location. In some embodiments, the user need not be at any particular location for the user device encryption system to activate.

In some embodiments the user device includes a wearable user device. The wearable user device may include a smartwatch, a smart ring, head gear, epidermal electronics, smart glasses, smart clothing, smart jewelry, and/or the like. In this regard, a "wearable user device" may include any technology design to be used while it is worn, wherein the technology may detect, analyze, and/or transmit information of an action of the wearer (e.g., user). The wearable user device may include sensors, electronics, software, and/or connectivity components that may communicate with a network.

In some embodiments, the user device encryption system may encrypt the user data to create encrypted user data, wherein the encrypted user data includes encrypted gesture data, and wherein encrypting the user data includes a lattice-based multivariate polynomial encryption. In some embodiments, the encrypted user data may include the gesture data, geolocation data, biometric data, physical activity data, health metrics, sleep data, location data, environmental data, interaction data, notifications and responses, and/or the like. The lattice-based multivariate polynomial encryption may include a grid-like structure (e.g., a lattice) of points in multidimensional space, wherein the security is derived from the difficulty of the computational problems associated with the lattice. The computational problems associated with the lattice may include the Shortest Vector Problem (SVP) and Closest Vector Problem (CVP). The multivariate polynomials may include finding solutions to equations that have multiple variables and are polynomial in nature. The lattice-based multivariate polynomial encryption may include efficient and scalable ways to encrypt the user data.

In some embodiments, the lattice based post quantum cryptography encryption may be associated with constructing cryptographic primitives that involve lattices. The mathematics associated with the lattices may be based on the SVP and CVP problems (e.g., finding the shortest vector or closest vectors in high-dimensional lattice). The difficulty of such problems may increase as the dimension of the lattice increases. The increase in difficulty makes the problems (e.g., encryption) infeasible to reverse without the key to the encryption. Further, the lattice based post quantum cryptography encryption may be resistant to quantum-based misappropriations due to the advanced encryption methods.

In some embodiments, the user device encryption system may store the encrypted user data in a blockchain. The blockchain may include a distributed ledger that further includes a growing list of records (e.g., blocks) that are securely linked together. The blocks may be linked together via encryption, cryptographic hashes, lattice based post quantum cryptography encryption, or other methods known in the art.

In some embodiments, each block on the blockchain may be associated with an entity, component, device, and/or the like used in the process of a resource transaction. In this way, the blocks may include information that, when a resource transaction is initiated, may be used to execute and complete the transaction. For instance, a user may interact (through the user device) with a merchant kiosk to perform a resource transaction. A block on the blockchain may be associated with the merchant kiosk that the system may use to complete the transaction.

The blockchain may include one or more layers that may be used to organize processes on the blockchain. For instance, the blockchain may include a data layer, network layer, consensus algorithm layer, contract layer, application, and/or the like. Each layer may have a functionality that may be used to complete transactions on the blockchain.

In some embodiments, the user device encryption system may validate the blockchain with a consensus algorithm. The consensus algorithm may determine which nodes may have the right to record transactions on the blockchain. The consensus algorithm may use a verification process that includes verifying the authenticity of all the transactions in the blockchain. In this way, nodes may be selected to validate and verify transactions. Upon successfully validating the transaction, the block will be added to the blockchain network.

In some embodiments, the consensus algorithm includes a proof of authority consensus algorithm. The proof of authority may include validator nodes on the blockchain that maintain the overall integrity of the network. The validator nodes may meet certain requirements, such as identification, eligibility, reputation, association with the host, resource staking, and adherence to procedures for validating and producing blocks on the blockchain. A lead validator node may be chosen at random from the validator nodes to initially sign a particular block. The other validator nodes may then agree that the block should be added to the blockchain.

In some embodiments, validating the blockchain with the consensus algorithm further includes determining a malicious block, wherein the malicious block is associated with the blockchain. In some embodiments, validating the blockchain with the consensus algorithm further includes invalidating the malicious block, wherein invalidating the malicious block includes reconfiguring the blockchain to disassociate with the malicious block. In this way, the malicious block may have been added by a malicious validator node. The other validator nodes may recognize the malicious activity and decide to invalidate the activity, the block, the validator node, or the like. For instance, if a merchant kiosk is determined to include malicious activity (e.g., due to misappropriating user device information), the validator nodes on the network may indicate such malicious activity. The blockchain may then be reconfigured to disassociate (e.g., ban, prohibit, block, or the like) the merchant kiosk from the blockchain.

In some embodiments, the neural network includes a recurrent neural network (RNN), wherein the RNN maps the user data to the unique sequence in a lattice. The RNN may be suited to sequential data processing which may include time series analysis and/or natural language processing. Each layer of the RNN may include one or more nodes. The RNN may allow the output from some nodes in the network to effect subsequent inputs to the same nodes. In this way, the output of RNNs depend on the prior inputs (e.g., the output of a node may be fed back into the network). Thus, the RNN may remember certain information allowing the RNN to predict the output of the next process due to the information persisting within the network.

In some embodiments, the RNN may include an input layer, a hidden layer, and an output layer. The input layer may ingest the data (e.g., the user data). The hidden layer may receive the inputs from the input layer and also from the hidden layers previous state. Therefore, the nodes within the hidden layer are connected to the input layer and to themselves. The output layer produces the final output of the network.

In some embodiments, the system may assign weights to the RNN. The weighting may occur in each layer (e.g., input, hidden, and output) of the RNN. Input weights may be applied to the connections between the input layer and the hidden layer and may determine the influence the input (e.g., ingested data, user data, or the like) has on the hidden layer nodes. Recurrent weights may be applied to the nodes within the hidden layer, and may determine how much influence the previous state of the hidden nodes has in the current state. Output weights may influence the connections between the hidden layer and output layer.

Further, backpropagation may be used, which includes an algorithm that calculates the loss function with respect to the weights of the network. In this way, backpropagation may include the system training itself by calculating errors from through the input layer, hidden layer, and output layer. Thus, the weights (e.g., input weights, recurrent weights, and output weights) associated with the RNN may be adjusted to better suit the needs of the system.

In some embodiments, the lattice includes a digital personal identification number (PIN), a timestamp, and the user data. The digital PIN, timestamp, and user data may be encrypted using the multivariate polynomials. The digital PIN may include a biometric authentication and a passphrase. For instance, the biometric authentication may include a fingerprint, facial recognition, iris recognition, or the like, that may be used to identify a user. In another instance, the passphrase may be a unique phrase used by the user for authentication purposes. In some embodiments, the digital PIN may include just a biometric authentication, passphrase, or a combination of both.

In some embodiments, the timestamp may include a timestamp associated with the resource transaction. In this way, the timestamp may include a date (e.g., day, month, year, or the like) and a time that indicates with the user initiated the resource transaction with the user device. The user data may include any other data associated with the user used during the resource transaction. For instance, the location (e.g., geolocation) of the user device may be included in the lattice.

In some embodiments, the blockchain includes one or more blocks, wherein the one or more blocks include additional data from one or more entities. The additional data from the one or more entities may include data associated with the entity, such as a geolocation of the entity, a timestamp of a resource transaction, or the like. In this way, the additional data may be used in the blockchain for further authentication of the resource transaction, a node, or the like.

FIG. 3 illustrates a process flow of an example embodiment of the user device encryption system, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, a user device encryption system (e.g., similar to one or more of the systems described herein with respect to FIGS. 1A-1C) may perform one or more of the steps of process flow 300. For example, a user device encryption system (e.g., the system 130 described herein with respect to FIGS. 1A-1C) may perform the steps of process flow 300.

As shown in block 302, the process flow 300 of this embodiment includes sensor data. In some embodiments, the sensor data 302 may include data associated with a sensor used during a resource transaction. In some embodiments, the sensor may be associated with a user device. The sensor may receive information from the user the user uses during a resource transaction. For instance, the user may use gesture data, health data, geolocation data, or the like during a resource transaction data. In this way, the sensor may use this data (e.g., sensor data) during a resource transaction.

In some embodiments, the sensor may be associated with an entity with which the user wishes to initiate a resource transaction. For instance, a user may wish to initiate a resource transaction with a merchant kiosk. The user may use a user device to interact with the merchant kiosk to do so. The merchant kiosk may include a sensor that the user device may interact with during the resource transaction.

As shown in block 304, the process flow 300 of this embodiment includes digital data sequence. The digital data sequence may include a RNN that may order the data received from the sensor (e.g., sensor data). The data may be sequenced in a unique way and mapped to points in a lattice.

As shown in block 306, the process flow 300 of this embodiment includes sequenced data. In some embodiments, the sequenced data may be weighted. In this way, the weighting of the data may include an initial weighting, or an updated weighting that adjusts based on the needs of the system, user, entity, or the like.

As shown in block 308, the process flow 300 of this embodiment includes lattice based post-quantum cryptography encryption. The system's use of computationally complex problems include creating robust encryption methods for the user data associated with the system. The system may encrypt the user data, timestamp, and sensor data using lattice based post-quantum cryptography encryption.

As shown in block 310, the process flow 300 of this embodiment includes a blockchain. In some embodiments, the blockchain may be used by, or associated with, the entity the user is interacting with. For instance, the user may interact (via the resource transaction) with an entity that may be associated with a blockchain. In another instance, the user may interact with an entity that may use a blockchain associated with a third party entity.

As shown in block 312, the process flow 300 of this embodiment includes a block validator. In this way, the block validator may include one or more validator nodes. The validator nodes may validate blocks within the blockchain. In some embodiments, the validator nodes may validate the other validator nodes to ensure they are not malicious. In an instance in which a validator node is determined to be malicious, the system may reconfigure the blockchain to disassociate with the malicious validator node.

As shown in block 314, the process flow 300 of this embodiment includes an issuing entity. In some embodiments, the issuing entity may include the entity that is issuing the resources during a resource transaction. In this way, the issuing entity may be associated with a user performing the resource transaction. For instance, if a user is performing a resource transaction, the issuing entity may issue the resources associated with the user to complete the transaction.

As shown in block 316, the process flow 300 of this embodiment includes an entity gateway. The entity gateway may be a gateway through which the entities may transfer resources. The entity gateway may be associated with the issuing entity, the acquiring entity, or a third party entity.

As shown in block 318, the process flow 300 of this embodiment includes an acquiring entity. In some embodiments, the acquiring entity may include an entity that is associated with the entity device, such as a merchant kiosk, terminal, or the like. In this way, the user may interact with the acquiring entity's device through the user device to complete a resource transaction. For instance, the acquiring entity's device may be a merchant kiosk the user wishes to interact with. The acquiring entity may be the entity that is acquiring the resources during the resource transaction.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for encrypting user device resource transactions, the system comprising:

a processing device;

a non-transitory storage device containing instructions when executed by the processing device, causes the processing device to perform the steps of:

transmit user data to a neural network, wherein the user data comprises gesture data, wherein the neural network sequences the user data in a unique sequence, wherein the gesture data comprises data associated with how the user interacts with the user's surroundings, wherein the neural network comprises a recurrent neural network configured to map the user data to the unique sequence in a lattice, and wherein the unique sequence comprises a digital personal identification number (PIN), a timestamp, the gesture data, and the user data;

encrypt the user data to create encrypted user data, wherein the encrypted user data comprises encrypted gesture data, wherein encrypting the user data comprises a lattice-based multivariate polynomial encryption, and wherein the lattice-based multivariate polynomial encryption's security is derived from the difficulty of computational problems associated with the lattice;

store the encrypted user data in a blockchain; and validate the blockchain with a consensus algorithm, wherein validating the blockchain with the consensus algorithm further comprises:

determining a malicious block, wherein the malicious block is associated with the blockchain; and invalidating the malicious block, wherein invalidating the malicious block comprises reconfiguring the blockchain to disassociate with the malicious block.

2. The system of claim 1, wherein executing the instructions further causes the processing device to receive the user data from a user device, wherein the user data comprises biometric data and geolocation data, and wherein the user device comprises a wearable user device.

3. The system of claim 1, wherein the blockchain comprises one or more blocks, and wherein the one or more blocks comprise additional data from one or more entities.

4. The system of claim 1, wherein the consensus algorithm comprises a proof of authority consensus algorithm.

5. A computer program product for encrypting user device transactions, the computer program product comprising a non-transitory computer-readable medium comprising code causing an apparatus to:

transmit user data to a neural network, wherein the user data comprises gesture data, wherein the neural network sequences the user data in a unique sequence, wherein the gesture data comprises data associated with how the user interacts with the user's surroundings, wherein the neural network comprises a recurrent neural network configured to map the user data to the unique sequence in a lattice, and wherein the unique sequence comprises a digital personal identification number (PIN), a timestamp, the gesture data, and the user data;

encrypt the user data to create encrypted user data, wherein the encrypted user data comprises encrypted gesture data, wherein encrypting the user data comprises a lattice-based multivariate polynomial encryption, and wherein the lattice-based multivariate polynomial encryption's security is derived from the difficulty of computational problems associated with the lattice;

store the encrypted user data in a blockchain; and validate the blockchain with a consensus algorithm, wherein validating the blockchain with the consensus algorithm further comprises:

determining a malicious block, wherein the malicious block is associated with the blockchain; and invalidating the malicious block, wherein invalidating the malicious block comprises reconfiguring the blockchain to disassociate with the malicious block.

6. The computer program product of claim 5, wherein the code further causes the apparatus to receive the user data from a user device, wherein the user data comprises biometric data and geolocation data, and wherein the user device comprises a wearable user device.

7. The computer program product of claim 5, wherein the blockchain comprises one or more blocks, and wherein the one or more blocks comprise additional data from one or more entities.

8. The computer program product of claim 5, wherein the consensus algorithm comprises a proof of authority consensus algorithm.

9. A method for encrypting user device resource transactions, the method comprising:

transmitting user data to a neural network, wherein the user data comprises gesture data, wherein the neural network sequences the user data in a unique sequence, wherein the gesture data comprises data associated with how the user interacts with the user's surroundings, wherein the neural network comprises a recurrent neural network configured to map the user data to the unique sequence in a lattice, and wherein the unique sequence comprises a digital personal identification number (PIN), a timestamp, the gesture data, and the user data;

encrypting the user data to create encrypted user data, wherein the encrypted user data comprises encrypted gesture data, wherein encrypting the user data comprises a lattice-based multivariate polynomial encryption, and wherein the lattice-based multivariate polynomial encryption's security is derived from the difficulty of computational problems associated with the lattice;

storing the encrypted user data in a blockchain; and validating the blockchain with a consensus algorithm, wherein validating the blockchain with the consensus algorithm further comprises:

determining a malicious block, wherein the malicious block is associated with the blockchain; and invalidating the malicious block, wherein invalidating the malicious block comprises reconfiguring the blockchain to disassociate with the malicious block.

10. The method of claim 9, wherein the method further comprises receiving the user data from a user device, wherein the user data comprises biometric data and geolocation data, and wherein the user device comprises a wearable user device.

11. The method of claim 9, wherein the blockchain comprises one or more blocks, and wherein the one or more blocks comprise additional data from one or more entities.

* * * * *